US008185675B1

United States Patent
Ji

(10) Patent No.: US 8,185,675 B1
(45) Date of Patent: May 22, 2012

(54) INTERFACE SYSTEM AND OPERATING METHOD THEREOF

(75) Inventor: Ming-Xing Ji, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 13/101,570

(22) Filed: May 5, 2011

(30) Foreign Application Priority Data

Jan. 4, 2011 (CN) .......................... 2011 1 0000310

(51) Int. Cl.
*G06F 3/00* (2006.01)
*G06F 5/00* (2006.01)
*G06F 13/12* (2006.01)
*G06F 13/38* (2006.01)
*G06F 13/368* (2006.01)
*G06F 13/00* (2006.01)
*G06F 13/36* (2006.01)

(52) U.S. Cl. .............. 710/62; 710/38; 710/64; 710/120; 710/300; 710/306; 710/316

(58) Field of Classification Search .................... None
See application file for complete search history.

(56) References Cited

U.S. PATENT DOCUMENTS

| 7,624,222 B2 * | 11/2009 | Nanda et al. ............... 710/316 |
| 7,657,680 B2 * | 2/2010 | Dybsetter .................... 710/106 |
| 2004/0212607 A1 * | 10/2004 | Tomiyasu .................. 345/204 |
| 2005/0144351 A1 * | 6/2005 | Ying et al. ................. 710/316 |
| 2009/0245344 A1 * | 10/2009 | Ploix ......................... 375/238 |

* cited by examiner

*Primary Examiner* — Henry Tsai
*Assistant Examiner* — Kris Rhu
(74) *Attorney, Agent, or Firm* — Thomas|Kayden

(57) ABSTRACT

An interface system which is adapted to a portable device is provided. The interface system includes a control chip, a first peripheral device, an external interface port, a first, a second, a third bus driver and a control unit. The control chip provides at least a first and a second interface port. The first bus driver has a first, a second input port and an output port. The first bus driver is used to interface the first input port with the output port or interface the second input port with the output port according to a first control signal. The second bus driver is used to interface the first interface port with the external interface port or interface the output port with the external interface port according to a second control signal. The third bus driver is used to interface the first peripheral device with the second input port or interface the second interface port with the first peripheral device according to the first control signal. The control unit is used to determine the first and the second control signal status.

20 Claims, 4 Drawing Sheets

INTERFACE SYSTEM AND OPERATING METHOD THEREOF

CROSS REFERENCE TO RELATED APPLICATION

This Application claims priority of China Patent Application No. 201110000310.X, filed on Jan. 4, 2011, the entirety of which is incorporated by reference herein.

BACKGROUND OF THE INVENTION

1. Field of the Invention

The present disclosure relates to an interface system and in particular relates to an interface system of a portable computer device.

2. Description of the Related Art

Desktop computers have developed into portable notebooks due to computer technology advancement. Afterwards, thinner and lighter netbooks were developed therefrom. Hard disks and optical disks can be disposed in the notebooks, but only hard disks can be disposed in the netbooks. The notebooks and the netbooks both have external interface ports such as an External Serial Advanced Technology Attachment (ESATA). There is no optical disk in the netbook such that the optical disks only can be installed through an external interface port. However, this will raise cost and cause inconvenience. If the hard disks and the optical discs of the notebooks and the desk computers can be used by the netbooks through switching, then the netbooks can be more powerful and more convenient. Also, notebooks can utilize the hard disks of the netbooks through switching.

BRIEF SUMMARY OF INVENTION

A detailed description is given in the following embodiments with reference to the accompanying drawings.

In one embodiment, the invention provides an interface system. The interface system is adapted to a portable device. The interface system includes a control chip, a first peripheral device, an external interface port, a first, a second, a third bus driver and a control unit. The control chip provides at least a first and a second interface port. The first bus driver has a first, a second input port and an output port. The first bus driver is used to interface the first input port with the output port or interface the second input port with the output port according to a first control signal. The second bus driver is used to interface the first interface port with the external interface port or interface the output port with the external interface port according to a second control signal. The third bus driver is used to interface the first peripheral device with the second input port or interface the second interface port with the first peripheral device according to the first control signal. The control unit is used to determine the first and the second control signal status.

In another embodiment, the invention provides a method for operating an interface system. The method includes: providing at least a first interface port, a second interface port, a first peripheral device, an external interface port, a first bus driver, a second bus driver, a third bus driver and a control unit, wherein the first bus driver has a first input port, a second input port and an output port; determining the first control signal status and the second control signal status by the control unit; interfacing the first input port and the output port according to a first status of a first control signal, or interfacing the second input port and the output port according to a second status of the first control signal by a first bus driver; interfacing the first interface port and the external interface port according to a first status of a second control signal, or interfacing the output port and the external interface port according to a second status of the second control signal by a second bus driver; interfacing the first peripheral device and the second input port according to the first status of the first control signal, or interfacing the second interface port and the first peripheral device according to the second status of the first control signal by a third bus driver.

The interface system and the method for operating the interface system facilitate portable computer devices to intercommunicate and share their hard disks and optical disks thereamong through the external interface ports. The interface systems are disposed inside the portable computer devices without extra switching devices so that costs are reduced and portability is improved.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
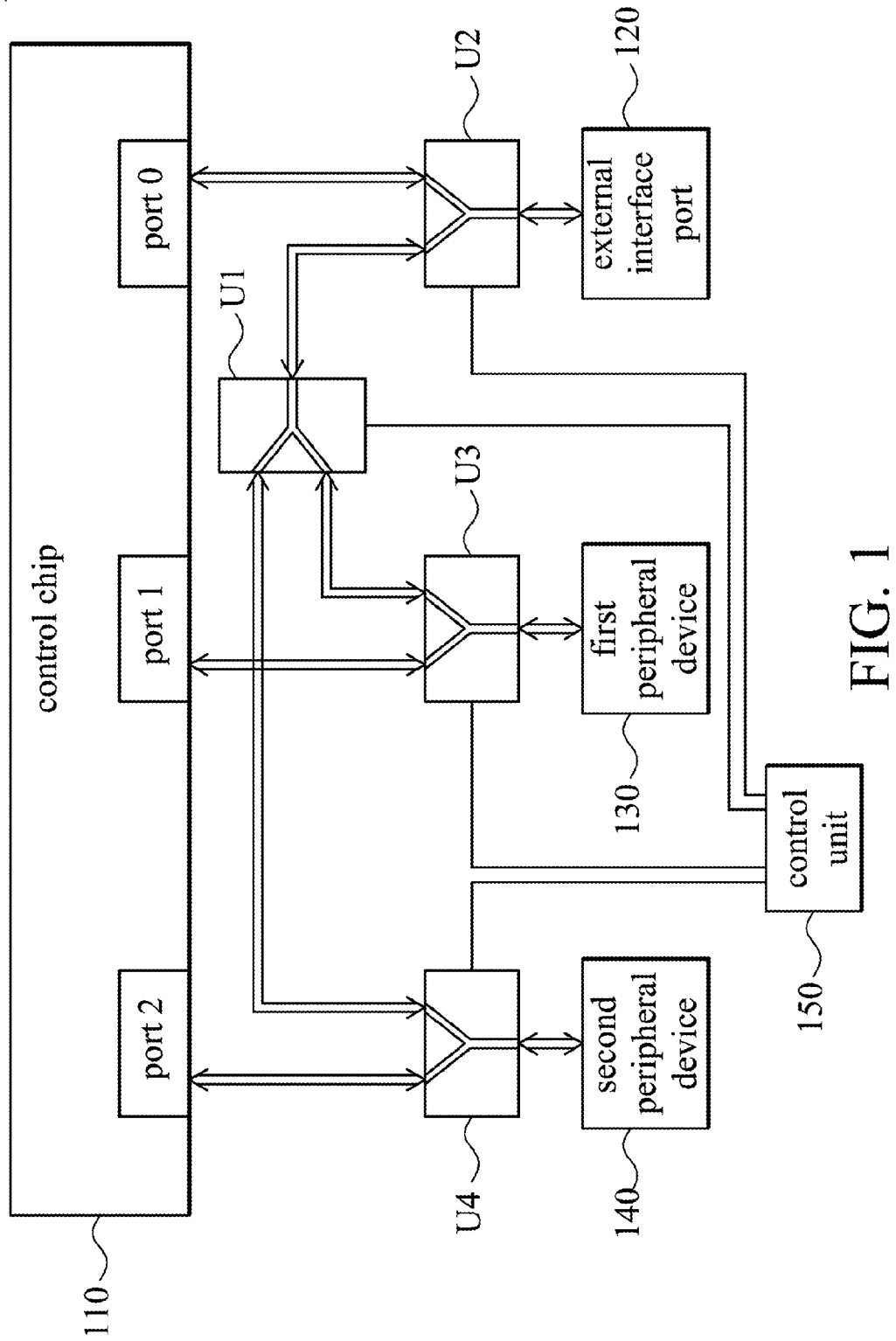
FIG. 1 is a diagram showing an interface system according to the embodiment.

FIG. 1 is a diagram showing an interface system according to the embodiment. The interface system 100 is disposed inside a portable device. The interface system 100 includes a control chip 110, a first bus driver U1, a second bus driver U2, a third bus driver U3, a fourth bus driver U4, a first peripheral device 130, a second peripheral device 140, an external interface port 120 and a control unit 150.

In the embodiment, the control chip 110 is a south bridge chip, but is not limited thereto. The control chip 110 provides a first interface port (port 0), a second interface port (port 1) and a third interface port (port 2). In the embodiment, the interface port is Serial Advanced Technology Attachment (SATA), but is not limited thereto.

The first peripheral device 130 is used to store data, such as a hard disk, but is not limited thereto. The external interface port 120 is used to interface the portable device with the outside device. In the embodiment, the external interface port 120 is an External Serial Advanced Technology Attachment (ESATA), but is not limited thereto.

In the embodiment, the bus drivers U1-U4 all include two input ports, an output port, and a select signal pin. The bus drivers U1-U4 may be multiplexers or buffers, such as a MAX 3786 mux/buffer. The bus drivers U1-U4 are used to selectively interface one of the two input ports with the output port. The bus drivers U1-U4 conduct the channels between one of the two input ports and the output port according to the first control signal and the second control signal. However, the bus drivers may have different activation methods according to different circuit connection structures and control signals.

In the embodiment, the input port of the first bus driver U1 is electrically connected to the input port of the third bus driver U3 and that of the fourth bus driver U4, and the output port of the first bus driver U1 is electrically connected to the input port of the fourth bus driver U4. The input port of the second bus driver U2 is electrically connected to the first interface port (port 0) and the output port of the second bus driver U2 is electrically connected to the external interface port 120. The input port of the third bus driver U3 is electrically connected to the second interface port (port 1) and the input port of the first bus driver U1, and the output port of the third bus driver U3 is electrically connected to the first peripheral device 130. The input port of the fourth bus driver U4 is electrically connected to the third interface port (port 2) and the input port of the first bus driver U1, and the output port of the fourth bus driver U4 is electrically to the second peripheral device 140. In the embodiment, the second peripheral device is used to read and write data such as optical disks, but is not limited thereto.

The control unit 150 is used to determine the first control signal status and the second signal status to facilitate the first peripheral device 130 to interface with the external port 120 through the first bus driver U1, the second bus driver U2 and the third bus driver U3, or facilitate the second peripheral device 140 to interface with the external interface port 120 through the first bus driver U1, the second bus driver U2, and the fourth bus driver U4.

Figure 2:
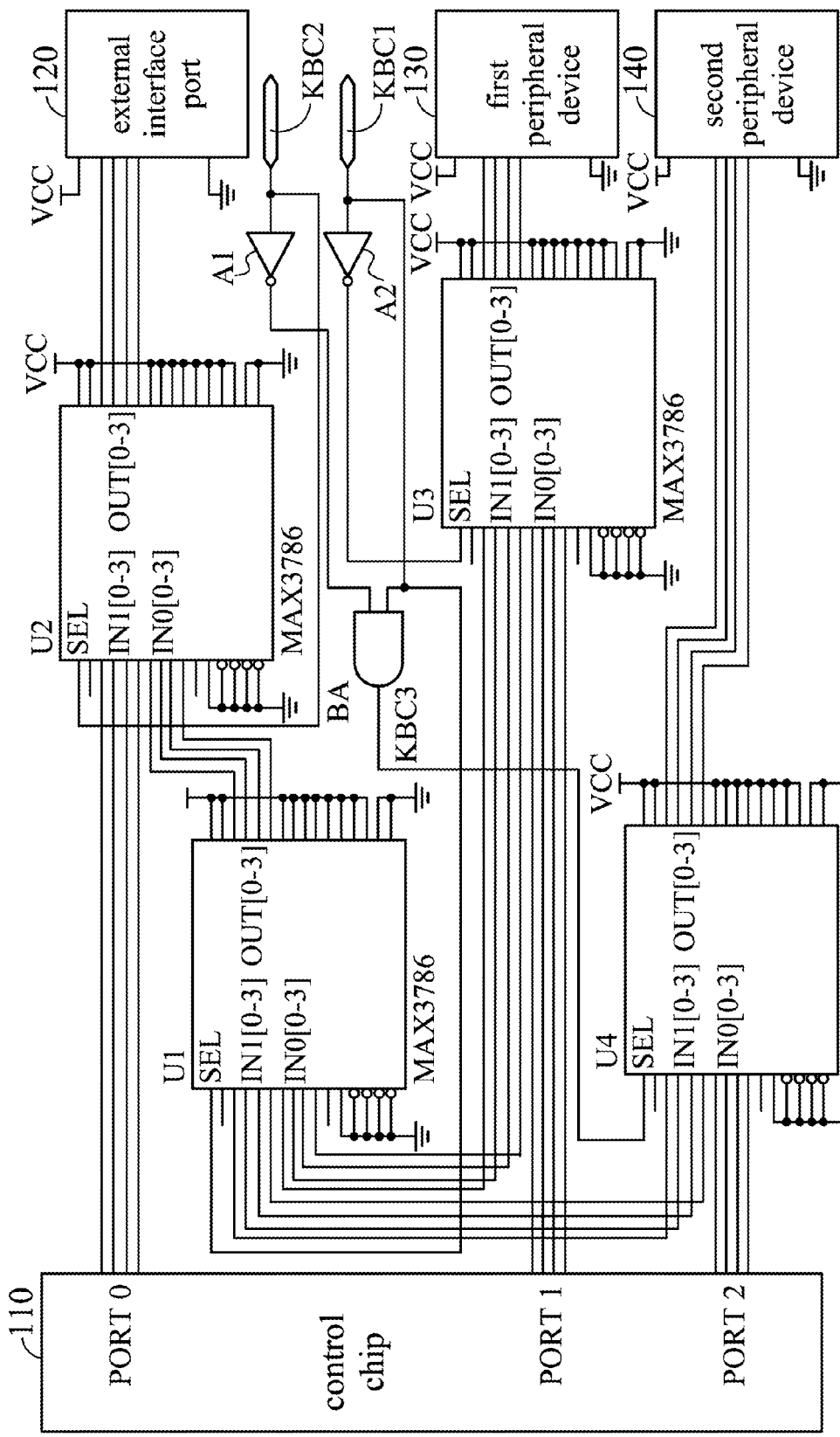
FIG. 2 is a schematic diagram showing the interface system according to the embodiment.

FIG. 2 is a schematic diagram showing the interface system according to the embodiment. In the embodiment, the interface system 100 is disposed inside a portable device. The interface system 100 includes a control chip 110, a first bus driver U1, a second bus driver U2, a third bus driver U3, a fourth bus driver U4, a first peripheral device 130, a second peripheral device 140, an external port 120, and inverters A1, B1, an AND gate BA, a first hot key (not showed), a second hot key (not showed) and a third hot key (not showed) in the control unit 150.

The first hot key is used activation of the first control signal and the second control signal to be in the second status. The second hot key is used activation of the first control signal to be in the first status and the second control signal to be in the second status. The third hot key is used activation of the first control signal and the second control signal to be in the first status. In the embodiment, the first status is a high level and the second status is a low level, but is not limited thereto. In other words, it can be understood from the FIG. 2 that activating the first hot key will make the first peripheral device 130 interface with the external interface port 120, activating the second hot key will make the second peripheral device 140 interface with the external interface port 120, and activating the third hot key will make all the peripheral devices not be able to interface with the external interface port 120, which is a normal mode. The first control signal KBC1 and the second control signal KBC2 generate the third control signal KBC3 (the output of AND gate BA) through the inverter A1 and AND gate BA, and the third control signal KBC3 is sent to the fourth bus driver U4 as its select signal.

In the embodiment, the first bus driver U1 defines the first input port, the second input port and the output port to distinguish from the input ports and output ports of other bus drivers. Refer to FIG. 2, the first bus driver U1 interfaces the first input port with the output port according to the first status (high level) of the first control signal, or interfaces the second input port with the output port according to the second status (low level) of the first control signal. The second bus driver U2 interfaces the first interface port (port 0) with the external interface port 120 according to the first status of the second control signal, or interfaces the output port with the external interface port 120 according to the second status of the second control signal. The third bus driver U3 interfaces the first peripheral device 130 and the second input port according to the first status of the first control signal, or interfaces the second interface port (port 1) and the first peripheral device 130 according to the second status of the first control signal. The fourth bus driver U4 interfaces the first input port with the second peripheral device 140 according to the first status of the third control signal, or interfaces the third interface port (port 2) with the second peripheral device 140 according to the second status of the third control signal.

Therefore, the first control signal status and the second control signal status determine that the first peripheral device 130 is interfaced with the external interface port 120 through the first bus driver U1, the second bus driver U2 and the third bus driver U3, or determine that the second peripheral device 130 is interfaced with the external interface port 120 through the first bus driver U1, the second bus driver U2 and the fourth bus driver U4. In other words, in the embodiment when the first hot key is activated, the first control signal and the second control signal are at low levels such that the first peripheral device 130 interfaces with the external interface port 120. When the second hot key is activated, the first control signal is at high level, the second control signal is at low level such that the second peripheral device 140 interfaces with the external interface port 120. When the hot keys are not activated or the third hot key is activated, the control signals are all at high levels (normal mode) such that the first interface port (port 0) interfaces with the external interface port 120, the second interface port (port 1) interfaces with the first peripheral device 130, and the third interface port (port 2) interfaces with the second peripheral device 140.

The hard disk is occupied by the portable device during power-on so that if the first peripheral device 130 is a hard disk, then the hard disk can not be shared by other outside devices. Hence, when the portable device is powered on, the interface system 100 will use a control mechanism to disable the first hot key to prevent the hard disk from being switched to be connected to the external interface port 120. After the portable device is shut down, activation of the first hot key or the second hot key will be allowed by the control mechanism.

Figure 3:
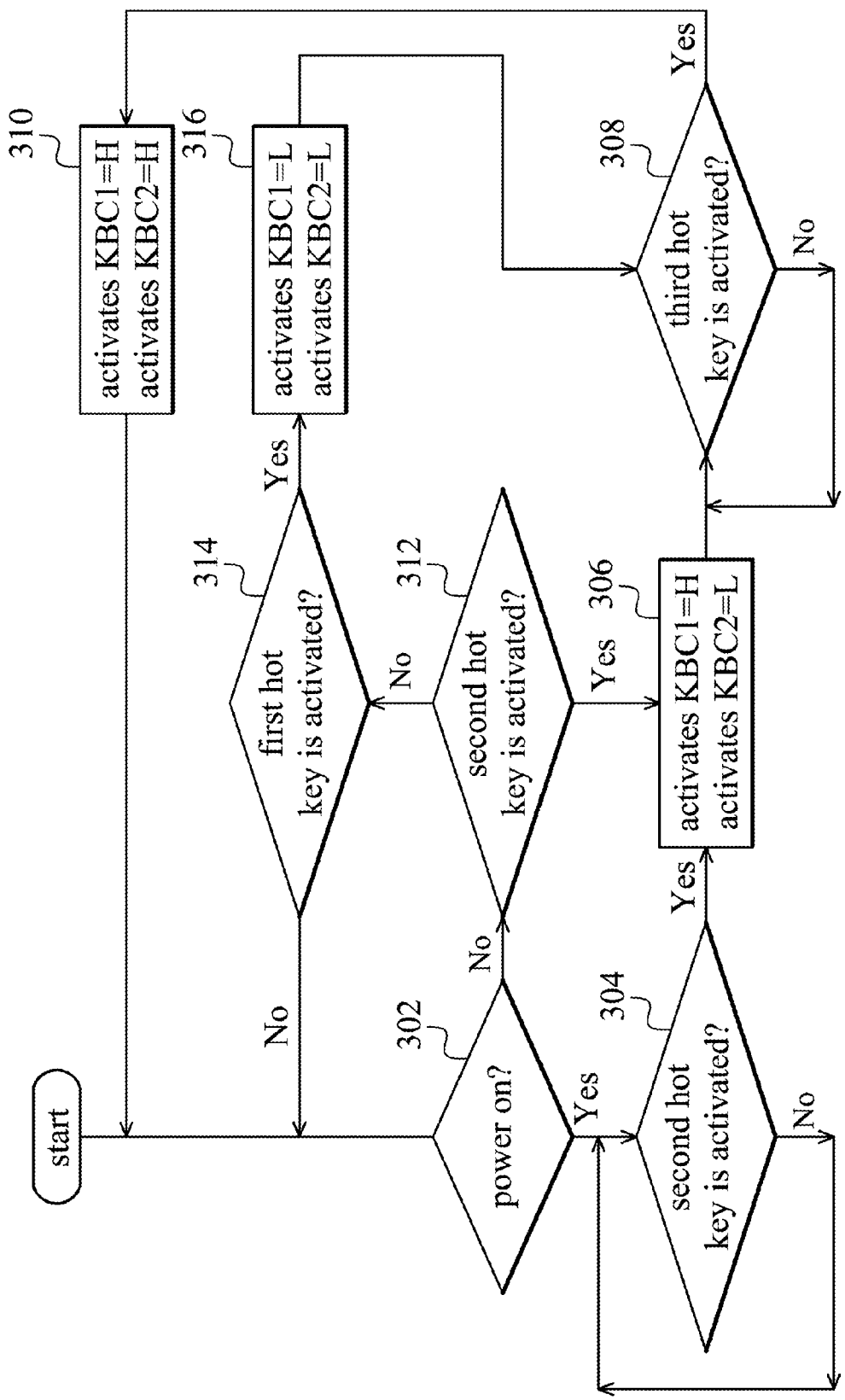
FIG. 3 is a flowchart showing a control mechanism according to the embodiment.

FIG. 3 is a flowchart showing a control mechanism according to the embodiment. In the embodiment, the first peripheral device 130 is a hard disk, the second peripheral device 140 is an optical disk, the first hot key is used to determine whether the first peripheral device 130 is shared or not, and the second hot key is used to determine whether the second peripheral device 140 is shared or not. In step 302, the control mechanism determines whether the power is on or not. If the power is on, then the procedure goes to the step 304, else the procedure goes to step 312. In the step 304, the control mechanism determines whether the second hot key is activated or not. If so, the procedure goes to step 306, the first control signal KBC1 is raised to a high level, and the second control signal KBC 2 is descended to a low level, and the interface system 100 interfaces the second peripheral device 140 with the external interface port 120. In step 308, the control mechanism determines whether the third hot key is activated or not. If so, the procedure goes to step 310 and the first control signal KBC1 and the second control signal KBC 2 are raised to a high level.

When the power is on, the procedure goes to step 312, wherein it is determined whether the second hot is activated or not. If so, the procedure goes to step 306, if not, the procedure goes to step 314. In step 314, it is determined whether the first hot key is activated or not. If not, the procedure goes to step 302. In step 316, the first control signal and the second control signal become low levels so that the interface system 100 interfaces the first peripheral device 130 with the external interface port 120. Finally, the procedure goes to step 308.

Figure 4:
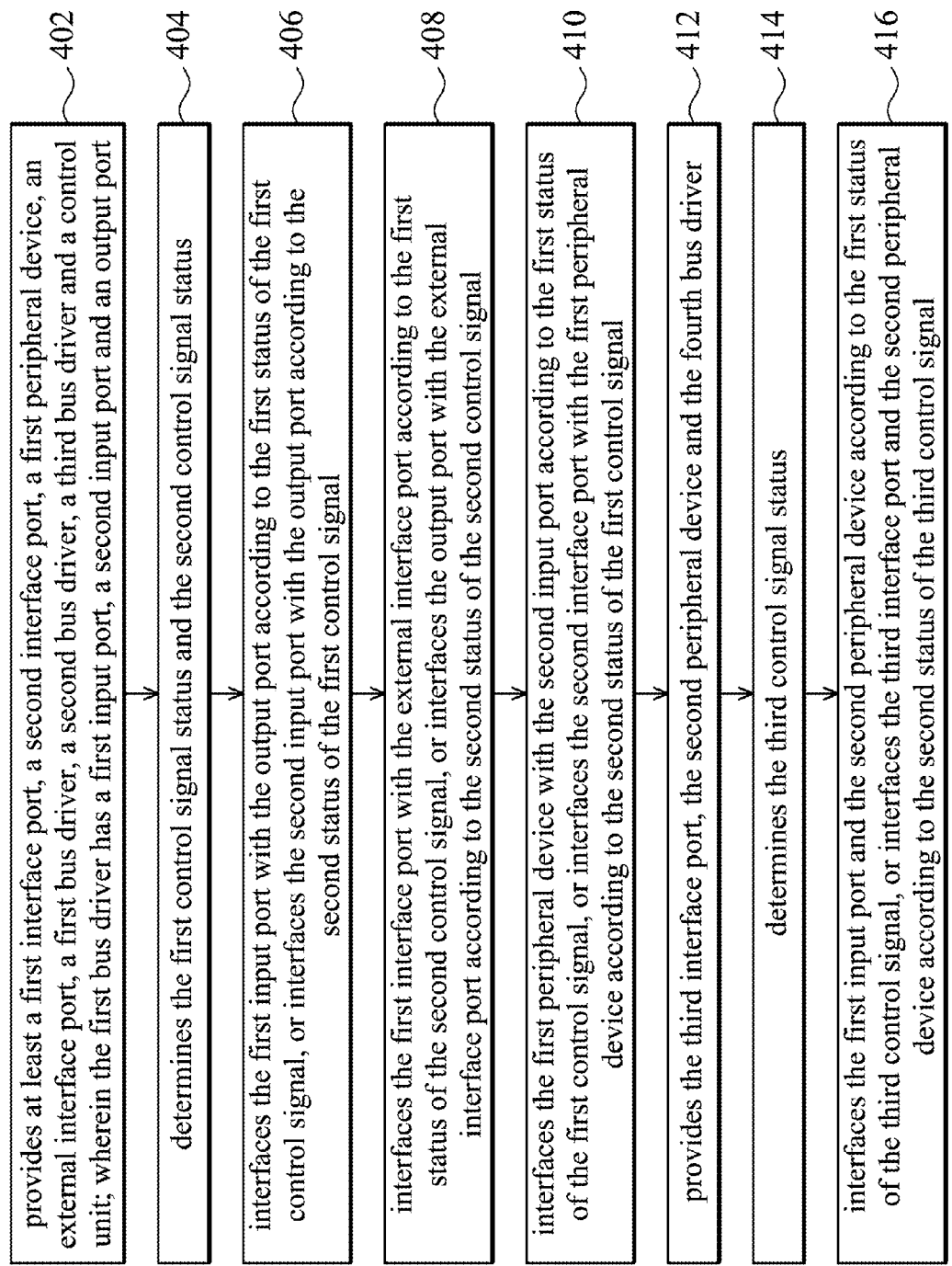
FIG. 4 is a flowchart showing a method for operating the interface system according to the embodiment.

FIG. 4 is a flowchart showing an operating method of the interface system according to the embodiment. In step 402, the interface system provides at least a first interface port, a second interface port, a first peripheral device, an external interface port, a first bus driver, a second bus driver, a third bus driver and a control unit, wherein the first bus driver has a first input port, a second input port and an output port. In step 404, the control unit determines the first control signal status and the second control signal status. In the embodiment, the first hot key in the control unit is activated such that the first control signal and the second control signal become the second status (low level). The second hot key in the control unit is activated such that the first control signal becomes the first status (high level) and the second control signal becomes the second status.

Next, in step 406, the first bus driver interfaces the first input port with the output port according to the first status of the first control signal, or interfaces the second input port with the output port according to the second status of the first control signal. In step 408, the second bus driver interfaces the first interface port with the external interface port according to the first status of the second control signal, or interfaces the output port with the external interface port according to the second status of the second control signal. Next, in step 410, the third bus driver interfaces the first peripheral device with the second input port according to the first status of the first control signal, or interfaces the second interface port with the first peripheral device according to the second status of the first control signal.

In step 412, the interface system provides the third interface port, the second peripheral device and the fourth bus driver. In step 414, the control unit determines the third control signal status. Finally, in step 416, the fourth bus driver interfaces the first input port and the second peripheral device according to the first status of the third control signal, or interfaces the third interface port and the second peripheral device according to the second status of the third control signal. The logic combination of the first control signal and the second control signal forms the third control signal. In the embodiment, the first control signal and the reversion of the second control signal execute an AND gate operation to obtain the third control signal.

It can be understood as mentioned above that the first hot key is activated such that the first peripheral device interfaces with the external interface port. The second hot key is activated such that the second peripheral device interfaces with the external interface port.

Moreover, there is a control mechanism in the embodiment. The first hot key is disabled when the portable device is powered on. Because the portable device will occupy a hard disk after being powered on, if the first peripheral device is a hard disk, then the hard disk can not be shared by other outside devices. Therefore, a first hot key is disabled after the portable device is powered on to prevent the hard disk from being switched to be connected to the external interface port. After the portable device is shut down, the mechanism allows the first hot key and the second hot key to be activated. The flowchart of the control mechanism is described above according to FIG. 3.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An interface system, which is adapted to a portable device, comprising:
 a control chip, for providing at least a first interface port and a second interface port;
 a first peripheral device, for storing data;
 an external interface port, for interfacing the portable device with an external device;
 a first bus driver having a first input port, a second input port and an output port, for interfacing the first input port and the output port according to a first status of a first control signal, or interfacing the second input port and the output port according to a second status of the first control signal;
 a second bus driver, electrically connected to the first interface port, the external interface port, and the output port, for interfacing the first interface port and the external interface port according to a first status of a second control signal, or interfacing the output port and the external interface port according to a second status of the second control signal;
 a third bus driver, electrically connected to the second interface port, the first peripheral device and the second input port, for interfacing the first peripheral device and the second input port according to the first status of the first control signal, or interfacing the second interface port and the first peripheral device according to the second status of the first control signal; and
 a control unit, for determining a first control signal status and a second control signal status.

2. The interface system as claimed in claim 1, further comprising:
 a third interface port, provided by the control chip;
 a second peripheral device, for reading and writing data; and
 a fourth bus driver, electrically connected to the third interface port, the second peripheral device and the first input port, for interfacing the first input with the second peripheral device according to a first status of a third control signal, or interfacing the third interfacing port and the second peripheral device according to a second status of the third control signal.

3. The interface system as claimed in claim 2, wherein the control unit comprises a first hot key, for activating the first control signal and the second control signal to be in the second status.

4. The interface system as claimed in claim 3, wherein the control unit further comprises a second hot key for activating the first control signal to be in the first status and the second control signal to be in the second status.

5. The interface system as claimed in claim 4, wherein the first status is a high level and the second status is a low level.

6. The interface system as claimed in claim 5, wherein the first hot key is disabled when the portable device is powered on.

7. The interface system as claimed in claim 6, wherein the first control signal and the third control signal determine the third control signal.

8. The interface system as claimed in claim 7, wherein the third control signal is at a logic combination of the first control signal and the second control signal.

9. The interface system as claimed in claim 8, wherein the bus drivers are multiplexers or buffers.

10. The interface system as claimed in claim 9, wherein the first peripheral device is a hard disk and the second peripheral device is an optical disk.

11. The interface system as claimed in 10, wherein the interface port is Serial Advanced Technology Attachment (SATA).

12. The interface system as claimed in claim 11, wherein the external interface port is an External Serial Advanced Technology Attachment (ESATA).

13. A method for operating an interface system, comprising:
   providing at least a first interface port, a second interface port, a first peripheral device, an external interface port, a first bus driver, a second bus driver, a third bus driver and a control unit, wherein the first bus driver has a first input port, a second input port and an output port;
   determining a first control signal status and a second control signal status by the control unit;
   interfacing the first input port and the output port according to a first status of a first control signal, or interfacing the second input port and the output port according to a second status of the first control signal by the first bus driver;
   interfacing the first interface port and the external interface port according to a first status of a second control signal, or interfacing the output port and the external interface port according to a second status of the second control signal by the second bus driver;
   interfacing the first peripheral device and the second input port according to the first status of the first control signal, or interfacing the second interface port and the first peripheral device according to the second status of the first control signal by the third bus driver.

14. The method for operating an interface system as claimed in claim 13, further comprising:
   providing a third interface port, a second peripheral device and a fourth bus driver;
   determining a third control signal status by the control unit; and
   interfacing the first input with the second peripheral device according to a first status of a third control signal, or interfacing the third interfacing port and the second peripheral device according to a second status of the third control signal by a fourth bus driver.

15. The method for operating an interface system as claimed in claim 14, wherein determining the first control signal status and the second control status comprises activating the first control signal to be in the first status and the second control signal to be in the second status by a hot key.

16. The method for operating an interface system as claimed in claim 15, wherein determining the first control signal status and the second control signal status comprises activating the first control to be in the first status and the second control signal to be in the second status by a second hot key.

17. The method for operating an interface system as claimed in claim 16, wherein the first status is a high level, and the second status is a low level.

18. The method for operating an interface system as claimed in claim 17, wherein the first hot key is disabled when the port device is powered on.

19. The method for operating an interface system as claimed in claim 18, wherein the first control signal and the second control signal determine the third control signal.

20. The method for operating an interface system as claimed in claim 19, wherein the third control signal is a logic combination of the first control signal and the second control signal.

* * * * *